United States Patent
Grott et al.

[11] Patent Number: 5,837,208
[45] Date of Patent: Nov. 17, 1998

[54] HYDROPROCESSING REACTOR MIXER/DISTRIBUTOR

[75] Inventors: Jeffrey Richard Grott; Robert L. Bunting, Jr., both of Chicago; Richard K. Hoehn, Mt. Prospect, all of Ill.; Randall Forrest Goodspeed, Flint, Tex.

[73] Assignee: UOP, Des Plaines, Ill.

[21] Appl. No.: 841,984

[22] Filed: Apr. 8, 1997

Related U.S. Application Data

[60] Provisional application No. 60/019,616 Jun. 12, 1996.
[51] Int. Cl.$^6$ ........................................... B01J 8/04
[52] U.S. Cl. ........................... 422/195; 422/215; 422/220
[58] Field of Search .................................. 422/195, 215, 422/220

[56] References Cited

U.S. PATENT DOCUMENTS

| | | | |
|---|---|---|---|
| 3,592,612 | 7/1971 | Ballard et al. | 422/195 |
| 3,824,080 | 7/1974 | Smith et al. | 422/195 |
| 3,977,834 | 8/1976 | Alcock et al. | 422/195 |
| 4,836,989 | 6/1989 | Aly et al. | 422/195 |
| 4,960,571 | 10/1990 | Bhagat et al. | 422/195 |
| 5,152,967 | 10/1992 | Rossetti et al. | 422/194 |
| 5,158,714 | 10/1992 | Shih et al. | 261/96 |
| 5,403,560 | 4/1995 | Deshpande et al. | 422/190 |
| 5,462,719 | 10/1995 | Pedersen et al. | 422/195 |
| 5,484,578 | 1/1996 | Muldowney et al. | 422/220 |
| 5,554,346 | 9/1996 | Perry et al. | 422/195 |
| 5,635,145 | 6/1997 | Den Hartog et al. | 422/195 |
| 5,690,896 | 11/1997 | Stangeland et al. | 422/195 |

*Primary Examiner*—Timothy McMahon
*Attorney, Agent, or Firm*—Thomas K. McBride; John F. Spears, Jr.

[57] ABSTRACT

Quench fluids being charged to a hydroprocessing reactor and liquid flowing downward within the reactor are admixed between the catalyst beds located in the reactor by an apparatus comprising three circular trays (16, 21, 22) and a mixing chamber (20). The mixing chamber receives liquid collected by the top tray and the quench material. The liquid effluent of the mixing chamber then falls upon a first distribution tray (21) while the vapor flows through an annular gap (17) between the first distribution tray (21) and the vessel wall (1). The two phases are then recontacted as they pass through a plurality of mixing caps (13) distributed over the surface of a lower second distribution tray (22).

3 Claims, 1 Drawing Sheet

5,837,208

HYDROPROCESSING REACTOR MIXER/DISTRIBUTOR

This application is related to and claims the benefit of the filing date of provisional application Ser. 60/019,616 filed Jun. 12, 1996.

FIELD OF THE INVENTION

The invention relates in general to a reactant distributor for use within a reactor. The invention more specifically relates to a mechanical arrangement for redistributing the gas and liquid phase reactants which are flowing downward through a fixed bed hydroprocessing reactor. The invention specifically relates to an apparatus for admixing a hydrogen-rich quench gas stream into the gas and liquid phase hydrocarbons flowing downward through a fixed bed hydrocracking reactor and distributing the cooled mixture across the upper surface of a bed of catalyst.

RELATED ART

U.S. Pat. No. 5,462,719 issued to M. J. Pedersen et al. describes an apparatus for use as a mixer and distributor for use within a reactor used in hydrocracking, hydrogenation and other hydrocarbon conversion reactions. The apparatus of this reference includes a grid 15 which supports catalyst above a void volume containing a divider plate having a central opening which delivers liquid to a centrally located "mixing box". A sieve plate and a riser tray supporting a plurality of capped risers are located below the mixing box.

U.S. Pat. No. 5,484,578 issued to G. P. Muldowney et al. shows a different design of a distributor for gas-liquid downflow reactors. In this design a rough cut distributor is supported by a plurality of rods 20 above a distributor tray.

U.S. Pat. No. 4,836,989 issued to F. A. Aly et al. illustrates yet another design for a distributor for use in reactors. This design employs a catalyst support tray located above a collector tray having spillways for liquid leading to a mixing chamber. A rough distribution tray and a lower final distribution tray having a plurality of vapor/liquid downcomers spread across the surface of the tray.

U.S. Pat. No. 5,158,714 issued to C. J. Shih et al. describes in detail the construction of a cap or downcomer for use on liquid distribution trays used in reactors.

U.S. Pat. No. 5,403,560 issued to V. A. Deshpande et al. illustrates yet another design for admixing a quench fluid into the reactants flowing downward through a fixed bed reactor and for subsequently redistributing the admixed materials across a lower bed of catalyst. This design employs a centrally located mixing device receiving liquid from a collection tray below the quench distributor.

U.S. Pat. No. 5,152,967 issued to S. J. Rossetti, et al. illustrates another mechanical arrangement for admixing quench fluid into the reactants between catalyst beds. This arrangement employs a liquid collection plate below the quench distributor and jet stirred mixing chamber located on the liquid collection plate, with a bottom-most plate employing caps to distribute the mixed phase material.

BRIEF SUMMARY OF THE INVENTION

The invention is an improved design of a vapor-liquid contactor and distributor for use within fixed bed hydrocarbon conversion reactors which provides excellent mixing in a reduced vertical distance or height, which decreases the amount of space within a reactor required for housing the mixer/distributor apparatus. A characterizing feature of the apparatus is a rough liquid distribution tray having a smaller diameter than the inside of the reactor vessel to define an annular vapor flow path to a lower vapor-liquid mixing/distribution tray.

One broad embodiment of the invention may be characterized as an apparatus for mixing and distributing generally downward flowing gas and liquid phase fluids in a vertical catalytic reactor having a cylindrical sidewall (1) and containing two or more fixed beds of solid catalyst separated by the apparatus, which apparatus comprises a horizontal vapor-liquid mixing and fluid distribution tray (22) which is supported in place by a support (4) attached to the sidewall (1) of the reactor, with multiple vapor-liquid contacting means (13) being uniformly distributed across the surface of the tray (22); a horizontal liquid distribution tray (21) which is connected to the vapor-liquid mixing and liquid distribution tray (22) by vertical members (11) extending upward from the vapor-liquid mixing and liquid distribution tray (22), the liquid distribution tray being substantially evenly perforated to provide a plurality of liquid passageways through the tray and having a smaller diameter than said catalytic reactor sidewall and thereby defining an annular vapor passageway (17) between the outer edge of the liquid distribution tray (21) and the inner surface of the sidewall (1); a horizontal substantially imperforate liquid collection tray (16) located above the liquid distribution tray (21) and defining a cylindrical void volume located between the liquid collection tray (16) and the vapor-liquid mixing and liquid distribution tray (22); and, liquid spillways (26) located on the liquid collection tray (16) and providing common liquid and vapor passageways through the liquid collection tray 16.

DETAILED DESCRIPTION AND PREFERRED EMBODIMENTS

Figure 1:
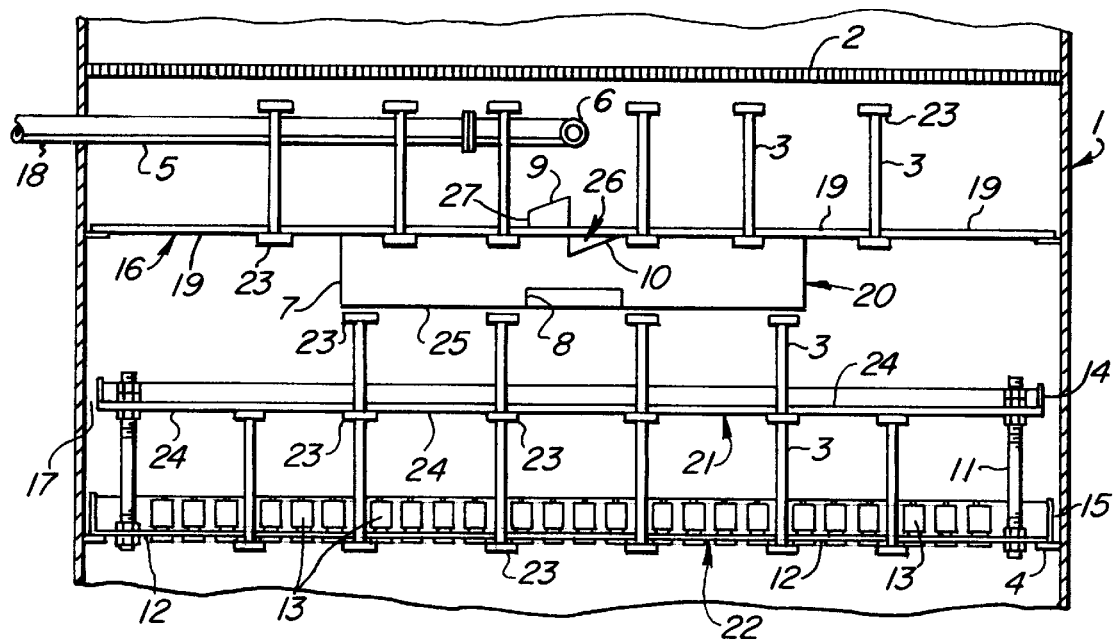
FIG. 1 is a simplified cross sectional view as seen looking horizontally across the apparatus as it would be used inside the cylindrical wall 1 of a reactor vessel.

Many useful hydrocarbon conversion reactions are performed in petroleum refineries and petrochemical plants using rectors containing two or more fixed beds of catalyst. When these reactions are exothermic in nature, such as in the case of alkylation, hydrocracking or hydrotreating, it is often necessary to provide a means to adjust the temperature of the reactants by providing some means of cooling. In some instances indirect heat exchange is employed. In others it has been found that the direct addition of a cool fluid normally referred to as quench is a better means of providing the needed cooling.

The added quench fluid must be mixed into the reactants present in the reactor, which are normally flowing downward, and the total two phase flow brought to a uniform temperature. This is necessary to ensure that when the mixture of quench fluid and reactants is passed into the next bed of catalyst all portions of the reactant are at the same temperature. It is also necessary to ensure that the reactant-quench mixture is distributed evenly across the entire surface of the next catalyst bed. Failure to achieve a uniform temperature or to evenly distribute the reactants can lead to one or both troubling conditions, poor process performance and decreased useful catalyst life. For instance, poor heat removal caused by poor flow can lead to the development of "hot spots" of increased catalytic activity. This will likely lead to a reduction in the selectivity of the catalyst, a situation especially noted in hydrocracking processes. This situation can also cause a premature aging of the catalyst. Poor reactant distribution can also lead to an increased rate of catalyst deactivation even without the formation of hot spots as by increased fouling due to a low level of hydrogen. Finally, poor reactant distribution leads to irregular temperature profiles through the catalyst bed. Such uneven reaction conditions result in the average performance of the catalyst being degraded. All of the catalyst is not being used effectively at the desired conditions. This can adversely impact selectivity and/or conversion in the desired reaction.

As a result of the commercial importance of this many designs have been developed in the art to provide good admixture of the quench fluid into the reactants and the redistribution of the resulting admixture across the next catalyst bed. However, in most commercial situations and especially in hydrocracking it is also important that total size of the equipment used to perform these two tasks is minimized. The most important dimension to minimize is the height of the apparatus. This is important because the height of the mixing/distribution apparatus increases the required size of the already large outer vessel employed as the high pressure reactor. As each reactor can contain as many as two or three of these devices the height of the mixing/distribution systems can be a significant part of the total height of the reactor. Any increase in the required size of the reactor increases the cost of the reactor, especially in the case of high pressure vessels having diameters on the order of two to five meters and wall thicknesses of 20–30 centimeters. The costs associated with an increase in vessel height are not limited to the cost of the vessel itself as any increase in vessel height leads to a corresponding increase in vessel weight which in turn requires a larger supporting foundation structure. Larger sized vessels can also cause problems in transportation and installation (erection) of the reactor. Reducing the height of the mixing/distributing device can therefore have a direct positive impact on reducing the total installed cost of the reactors. For instance, it has been estimated that installation of the subject invention instead of the previous employed system will reduce the cost of one normal sized commercial reactor by about one-half million dollars.

It is an objective of this invention to provide a reactant distribution apparatus for use in hydrocarbon conversion reactors. It is a further objective of the subject invention to provide a quench mixing and reactant distributor device for use in hydrocracking reactors. It is a specific objective of the invention to reduce the height of mixing/distribution devices for use in high pressure mixed phase reactors.

The subject invention achieves these objectives by the use of a unique structure characterized in part by the use of a rough liquid distribution tray that provides a separate annular vapor passageway between the raised edge of the tray and the inner surface of the surrounding outer vessel.

While the subject apparatus can be used to perform a wide variety of reactions, the following description is based on its use in the hydrocracking of petroleum fractions derived from crude oil. Minor variations as may be needed to adapt the apparatus to other processes such as alkylation or hydrogenation are within the expertise of those skilled in the art.

The subject invention is fabricated from standard materials using customary methods of construction for apparatus of this nature. The subject invention resides in the structure and structural arrangement of the various parts of the apparatus. The overall structure of the subject invention can be best discerned by reference to the drawings. FIG. 1 presents a simplified view as seen looking horizontally through a cross section of a reactor having a cylindrical outer wall 1 and employing the subject apparatus between two beds of solid particulate catalyst. For clarity the catalyst is not illustrated in this drawing. The catalyst and any layer of different diameter ceramic balls usually employed as a catalyst support in the top and bottom of the catalyst beds may be of conventional design and do not form a part of the subject invention. A single reactor may contain two or three of the subject apparatus separating different catalyst beds.

Referring now to the drawing, the catalyst located in the portion of the reactor above the subject apparatus is retained at this higher elevation by a catalyst support tray 2. This tray needs to support the tremendous weight of the many tons of catalyst loaded above the tray plus the pressure drop of the circulating fluids flowing through the catalyst. It therefore is typically formed of a number of small perforated sections individually supported by a plurality of high strength beams not shown which horizontally traverse the internal volume of the reactor. A number of smaller horizontal support bars extend between the beams and support the multiple plates of perforated material which actually support the catalyst. As this is of a normal design, these beams and structural details have not been illustrated in the drawing. During use of the apparatus both the liquid and gas phase hydrocarbons, or other compounds, being processed in the reactor descend downward through the catalyst and pass through the many perforations provided in the catalyst support tray 2. This mixture of liquid and vapor emerges into a cylindrical void volume located between the catalyst support tray 2 and the liquid collection tray 16. A stream of relatively cool quench fluid is delivered to the reactor through line 18 and passed into this cylindrical void volume through a conduit or header 5 which is attached to the quench distributor 6. The distributor has openings not shown which discharge the entering fluid stream in different directions to promote its admixture into the gas and liquid which has emerged from the catalyst bed. Due to the large quantities flowing downward through the reactor and the relatively large size of this apparatus, the mixing at this point is quite incomplete and therefore further steps are required to assure that the fluids which descend downward from the overall apparatus are at a uniform temperature and composition.

The quench fluid is normally a hydrogen-rich gas stream when the subject apparatus is employed for hydrocracking, hydrotreating and similar refinery-based applications. The quench stream may be a mixed phase stream or alternatively a totally liquid stream. The quench stream serves dual purposes. It reduces the temperature of the reactants thereby countering the exothermic nature of the hydrocracking and hydrotreating reactions which tend to raise the temperature of the reactants beyond the desirable maximum temperature. A second basic function of the quench stream is to enrich the process fluids in hydrogen and to replace hydrogen which has been consumed in the reactions performed in the catalyst located above the subject apparatus.

The next step in the admixture of the process fluids present in the reactor comprises passing them downward from the substantially imperforate collection tray 16 through one of two spillways 26 into a mixing chamber 20. Three or more spillways could be employed if desired. Each spillway is defined by a scoop-shaped upper part formed of raised sidewalls 11 which project upward from the liquid collection tray 16. The outer edge of tray 16 rests upon the lip or support ring 4 and therefore substantially all liquid and vapor must flow downward through the spillways. The liquid flows off the tray 16 directly into the opening provided by the spillway. Each spillway is further defined by two inclined imperforate elements comprising an upper hood-like cover plate 9 and a lower fluid directing plate 10. In the spillway 26 shown in FIG. 1 liquid would flow into the spillway and be directed to the left as it flows downward across the lower ramp-like element 10. These inclined surfaces impart a horizontal component to the velocity of the descending fluids as they enter the mixing chamber 7.

Figure 2:
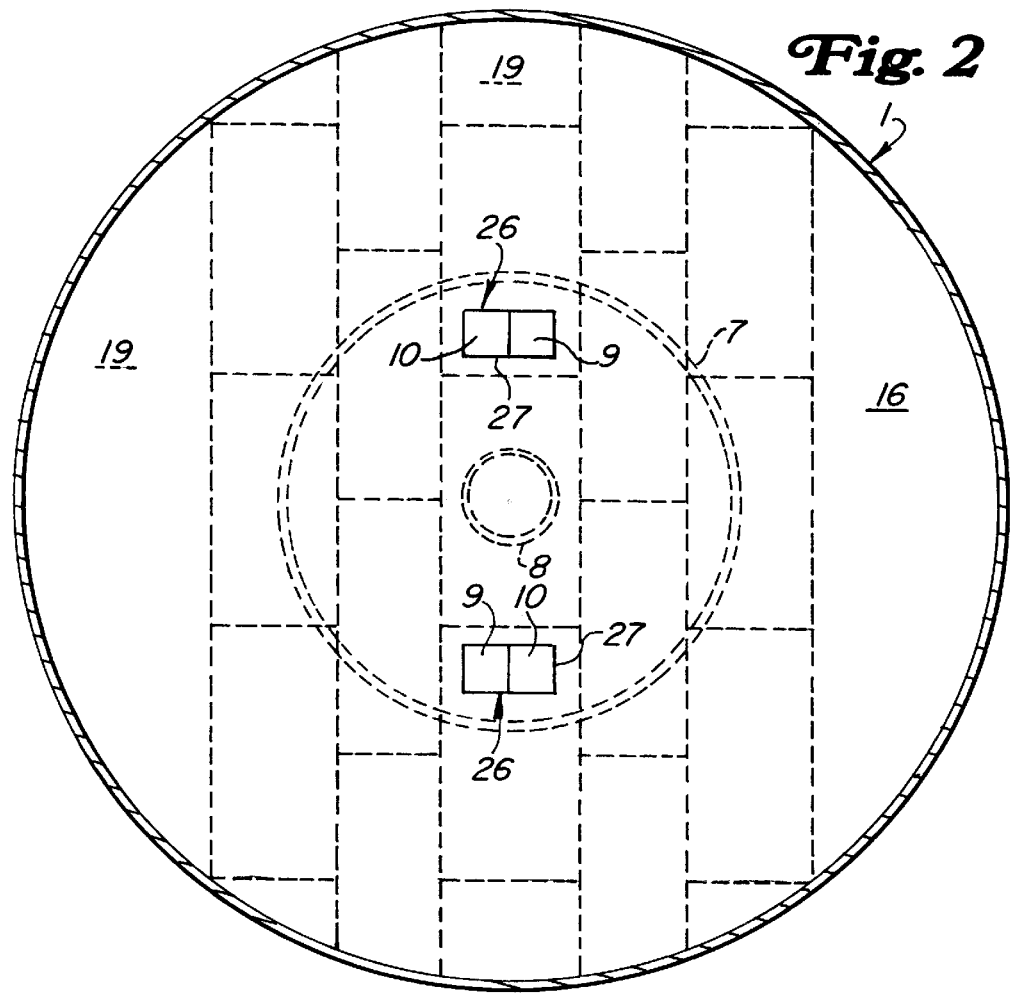
FIG. 2 is a simplified view as seen looking downward toward a liquid collection plate tray 16 and shows the placement of the mixing chamber 20 within the apparatus.

The liquid collection tray 16 has a substantially circular or disk-like overall shape but is actually formed from a large number of smaller adjoining plates 19 which are of differing sizes and shapes (See FIG. 2.). The plates 19 rest upon a support ring 4 attached to the inner surface of the vessel wall 1 and to a number of plates 23 forming the bottom of truss beams 3 which extend horizontally across the inner volume of the vessel. The plates 19 are normally fastened in place but are removable to allow access to the apparatus as for repair and inspection.

Forcing both the vapor and liquid phases to flow through the spillways 26 increases admixture of the liquid phases and increases heat and mass transfer between the vapor and liquid phases. The orientation of the spillways imparts a swirling motion to the fluids in the mixing chamber. The liquid entering the mixing chamber 20 through the spillways therefore flows in a circular pattern around the raceway defined by the outer cylindrical wall 7 and the inner cylindrical wall 8. The movement of the liquid tends to increase admixture of the liquid and again promotes mass and heat transfer between the vapor and liquid phases leading to closer attainment of equilibrium. The mixing chamber 20 is devoid of internal structure and is formed by the two spaced-apart cylindrical walls 7 and 8 and a discoid imperforate bottom plate 25. The imperforate nature of the walls 7 and 8 and the plate 25 forces the liquid and vapor to exit the mixing chamber via the cylindrical opening provided by the encircling wall 8. The vapor flows downward through this circular opening as the liquid overflows the wall 8 and both phases enter into a larger cylindrical void volume located between the collection tray 16 and the liquid distribution tray 21.

The liquid descending from the mixing chamber 20 will fall upon the rough liquid distribution tray 21 which is again formed by a number of smaller plates 24 assembled into a circular overall pattern. The rough liquid distribution tray is distinguished by a raised cylindrical wall 14 which extends around the outer periphery of the tray to retain liquid upon the tray. The liquid is therefore caused to pass downward through a number of equally spaced perforations not shown in the tray, although it could depending upon extreme circumstances, partially overflow the wall 14. Tray 21 has perforations, e.g., 16 mm, distributed in a uniform pattern across the tray except for the area under the opening in the bottom of the mixing chamber.

This structural arrangement results in there being an annular open passageway 17 provided between the cylindrical wall 14 and the inner surface of the wall 1 of the vessel. This annular passageway 17 is intended to be the primary and preferably only means by which vapor passes downward at this point in the apparatus. Most of the rough liquid distribution tray is supported by the horizontal plates 23 of the truss beams 3, with a number of threaded support means 11 which are bolted to the rough liquid distribution tray 21 and to the lower liquid distribution tray 22 supporting the deck plates 24 cantilevered past the beams 3. The individual plates 24 which form the periphery of the circular rough liquid distribution tray 21 are preferably fastened to both the truss beams 3 and to the circular wall 14.

The liquid which is descending through the rough liquid distribution tray 21 and the vapor which is passing through the annular space 17 are again subjected to admixture in the caps 13 located on the circular lower liquid distribution tray 22. The caps 13 are distributed in a uniform pattern and across substantially all of the upper surface of the lower liquid distribution tray 22. The tray 22 is again formed from a number of smaller differently shaped plates 12 which are fastened to the truss beams 3 and a support ring 4. The lower liquid distribution tray 22 includes a cylindrical wall 15 which joins the periphery of the tray 22 with a substantially liquid-tight seal which retains liquid upon the tray. The space between the cylindrical wall 15 and the inner wall of the vessel 1 is filled with flexible flow-retarding packing to force all downward fluid flow through the caps 13. The plates 12 forming the liquid distribution tray 22 are imperforate except for the openings provided for the caps 13.

The caps 13 employed in the subject apparatus are preferably similar in structure to those described in the previously referred to U.S. Pat. No. 5,158,714 which is incorporated herein for its teaching as to the design and structure of these elements. This structure comprises a cylindrical inner wall or riser which is attached to the edge of a circular opening in the bottom support plate in a substantially liquid-tight seal which forces both vapor and liquid to flow upward and enter the upper end of the inner wall before descending downward through the tray. A bell-like cap is placed over this cylindrical inner wall and defines an annular fluid passageway through which both the liquid and vapor phases must rise before entering the open end of the inner wall. Suitable means are provided to retain the outer cap above the upper end of the inner wall and to retain the cap in place, with these structural details not forming part of the subject invention. Alternative styles of vapor-liquid contacting means could be employed at this point in the apparatus. Preferably these means include an imperforate lower portion which causes the retention of a net liquid level upon the lower distribution tray 22. Also, preferably they have differing small openings through which both the liquid and vapor phases must pass to cause another stage of admixture of these two streams. A simple bell-shaped structure having numerous perforations is just one example of the differing mechanical designs which can be employed at this point. These elements preferably provide a positive resistance to flow to cause admixture of the two phases and must be arranged in a substantially uniform manner over the surface of the tray 22.

Alternative designs for these fluid-mixing caps are shown in U.S. Pat. Nos. 3,824,080; 4,836,989; 5,152,967 and 5,403,560.

FIG. 2 is the view seen looking downward towards the upper surface of the imperforate liquid collection tray 16. Tray 16 like the other trays in the subject apparatus is preferably formed from a number of smaller irregular shaped plates 19 which rest upon the horizontal truss beams extending across the internal volume of the reactor. The plates 19 of the liquid collection tray 16 are substantially imperforate with the joints between the plates and between the plates and truss beams being substantially liquid-tight such that the flowing vapor and liquid are forced to enter one of the two spillways provided on the tray. The upper portion of each box-like spillway is formed from vertical walls 11 extending upward from one of the plates 19 to form a hood or scoop extending above the tray 16. Together with the two parallel fluid-directing plates 9 and 10 they form a vertically inclined channel through which the descending vapor and liquid must flow. Located below the collection tray 16 and thus hidden from view is the cylindrical wall 7 of the mixing chamber 20, which preferably has an upper flanged lip which is bolted to the liquid collection tray 16. The liquid rotates around the annular raceway between walls 7 and 8 and eventually overflows the central wall 8 to exit the mixing chamber. The vapors present in the mixing chamber also exit through this same cylindrical opening defined by wall 8.

While operating conditions are not relevant to the structure of the apparatus it is believed useful to point out that the apparatus is normally employed in a hydrocracking reaction zone operating at a temperature of about 260 to 450 degrees C., and a pressure of about 7,000 to about 19,500 kPa.

A preferred embodiment of the subject invention can accordingly be characterized as an apparatus for mixing and distributing generally downward flowing gas and liquid phase fluids in a catalytic reactor containing one or more fixed beds of solid catalyst, which apparatus comprises a first mixing tray (22) which is supported in place by a support attached to the inner surface of the reactor; a second mixing tray (21) which is supported in place above the first mixing tray by vertical members (11) extending upward from the first mixing tray (22) and defining the upper extent of a first cylindrical void volume, and with the second mixing tray having a raised liquid retaining lip located at the periphery of the tray, with the periphery of the tray being located radially inward from the inner surface of the cylindrical reactor wall (1) to define an annular vapor passageway (14); a liquid collection tray (16) located above the second mixing tray (21) and defining a second cylindrical void volume located between the liquid collection tray (16) and the second mixing tray (21); a cylindrical mixing chamber (20) centrally located in said second void volume above the second mixing tray (21), with the mixing chamber located below an opening in the liquid collection tray (16) which directs downward flowing liquid from said liquid collection tray (16) into the mixing chamber; and, a catalyst support tray (2) located above the liquid collection tray (16) and defining the upper limit of a third void volume located between the catalyst support tray (2) and the liquid collection tray (16).

What is claimed:

1. An apparatus for mixing and distributing generally downward flowing gas and liquid phase fluids in a vertical catalytic reactor having a cylindrical sidewall (1) and containing one or more fixed beds of solid catalyst separated by the apparatus, which apparatus comprises:

(a) a horizontal vapor-liquid mixing and liquid distribution tray (22) which is supported in place by a support (4) attached to the sidewall (1) of the reactor, with multiple vapor-liquid contacting means (13) being uniformly distributed across the surface of the tray (22);

(b) a horizontal liquid distribution tray (21) which is supported above the vapor-liquid mixing and liquid distribution tray (22) by vertical members (11) extending upward from the vapor-liquid mixing and liquid distribution tray (22), the liquid distribution tray being evenly perforated to provide a plurality of liquid passageways through the tray and having a smaller diameter than said catalytic reactor sidewall to define an annular vapor passageway (17) between the outer edge of the liquid distribution tray (21) and the inner surface of the sidewall (1);

(c) a horizontal substantially imperforate liquid collection tray (16) located above the liquid distribution tray (21) and defining a cylindrical void volume located between the liquid collection tray (16) and the vapor-liquid mixing and liquid distribution tray (22);

(d) a pair of opposed, tangentially aligned liquid spillways (26) having a downward inclined bottom plate (10), the spillways being located on the liquid collection tray (16) and providing common liquid and vapor passageways through the liquid collection tray (16); and, (e) a cylindrical mixing chamber (20) having a cylindrical outer wall (7) and symmetrically located under the liquid spillways (26).

2. The apparatus of claim 1 wherein a vertical cylindrical wall (14) is attached to the outer edge of the liquid distribution tray (21).

3. An apparatus for mixing and distributing generally downward flowing gas and liquid phase fluids in a catalytic reactor containing one or more fixed beds of solid catalyst, which apparatus comprises:

(a) a first mixing tray (22) which is supported in place by a support attached to the inner surface of the reactor;

(b) an evenly perforated second mixing tray (21) which is supported in place above the first mixing tray by vertical members (11) extending upward from the first mixing tray (22) and defining the upper extent of a first cylindrical void volume, and with the second mixing tray having a raised liquid retaining lip (14) located at the periphery of the tray, with the periphery of the tray being located radially inward from the inner surface of the cylindrical reactor wall (1) to define an annular vapor passageway (17);

(c) a liquid collection tray (16) located above the second mixing tray (21) and defining a second cylindrical void volume located between the liquid collection tray (16) and the second mixing tray (21);

(d) a cylindrical mixing chamber (20) defined by an imperforate cylindrical outer wall (7) and a discoid bottom plate (25) having a central opening surrounded by a raised wall (8) such that a circular raceway is provided in the bottom portion of the mixing chamber, the mixing chamber (20) being centrally located in said second void volume above the second mixing tray (21), with the mixing chamber located below a pair of downward slanting spillways (26) which direct downward flowing vapor and liquid from said liquid collection tray (16) into the circular raceway of the mixing chamber; and, (e) a catalyst support tray (2) located above the liquid collection tray (16) and defining the upper limit of a third void volume located between the catalyst support tray (2) and the liquid collection tray (16).

\* \* \* \* \*